United States Patent
Flynn et al.

(10) Patent No.: US 7,559,655 B2
(45) Date of Patent: *Jul. 14, 2009

(54) OPTICAL SYSTEM WITH ANGULAR COMPENSATOR

(75) Inventors: Mark F. Flynn, San Jose, CA (US); Matthew F. Bone, Fremont, CA (US)

(73) Assignee: Aurora Systems, Inc., San Jose, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 11/652,772

(22) Filed: Jan. 12, 2007

(65) Prior Publication Data

US 2007/0121075 A1   May 31, 2007

Related U.S. Application Data

(63) Continuation of application No. 10/770,846, filed on Feb. 3, 2004, now Pat. No. 7,165,843.

(51) Int. Cl.
G03B 21/14 (2006.01)

(52) U.S. Cl. .......................... 353/20; 353/122; 349/75; 349/117; 349/119

(58) Field of Classification Search ................ 353/20, 353/69, 70, 122; 349/75, 99, 102, 117, 118, 349/119, 120, 121
See application file for complete search history.

(56) References Cited

U.S. PATENT DOCUMENTS

| | | | | |
|---|---|---|---|---|
| 4,701,028 A * | 10/1987 | Clerc et al. | ................... | 349/98 |
| 5,039,185 A * | 8/1991 | Uchida et al. | ................ | 349/119 |
| 5,298,199 A * | 3/1994 | Hirose et al. | ................. | 264/2.6 |
| 5,576,854 A * | 11/1996 | Schmidt et al. | ................. | 349/5 |
| 5,619,352 A * | 4/1997 | Koch et al. | ..................... | 349/89 |
| 5,986,733 A * | 11/1999 | Winker et al. | ................ | 349/120 |
| 6,016,173 A * | 1/2000 | Crandall | ....................... | 349/25 |
| 6,081,312 A * | 6/2000 | Aminaka et al. | ............. | 349/118 |
| 6,141,075 A * | 10/2000 | Ohmuro et al. | .............. | 349/130 |
| 6,307,607 B1 * | 10/2001 | Jepsen et al. | ................ | 349/117 |
| 6,450,645 B1 * | 9/2002 | Jeon | ............................ | 353/20 |
| 6,536,903 B2 * | 3/2003 | Bone | ........................... | 353/31 |
| 6,587,172 B1 * | 7/2003 | McKnight | .................... | 349/121 |
| 6,624,862 B1 * | 9/2003 | Hayashi et al. | ............. | 349/119 |
| 6,784,961 B2 * | 8/2004 | Suzuki et al. | ................ | 349/117 |
| 6,805,445 B2 * | 10/2004 | Silverstein et al. | ............ | 353/20 |
| 6,833,894 B2 * | 12/2004 | Gandhi et al. | ............... | 349/117 |
| 6,839,181 B1 * | 1/2005 | Cobb et al. | .................. | 359/634 |
| 6,909,473 B2 * | 6/2005 | Mi et al. | ......................... | 349/5 |
| 2003/0128320 A1 * | 7/2003 | Mi et al. | ...................... | 349/117 |
| 2003/0164909 A1 * | 9/2003 | Shimizu | ...................... | 349/113 |
| 2005/0168662 A1 * | 8/2005 | Nakagawa | ....................... | 349/5 |

* cited by examiner

*Primary Examiner*—William C Dowling
(74) *Attorney, Agent, or Firm*—Henneman & Associates, PLC; Larry E. Henneman, Jr.

(57) ABSTRACT

An electro-optical projection system includes a polarizer, a reflective light modulator, an analyzer, and a compensation element. The polarizer polarizes an illumination beam to form a polarized illumination beam. The reflective light modulator receives the polarized illumination beam along a first optical path, modulates the polarized illumination beam to form an imaging beam, and reflects the imaging beam along a second optical path. The compensation element is disposed in the polarized illumination beam and the imaging beam to compensate for polarization aberrations resulting from the birefringent property of the material of the reflective light modulator. The compensation plate has a retardation generally equal in magnitude and opposite in sign as compared to the retardation of the liquid crystal material of the reflective light modulator.

20 Claims, 7 Drawing Sheets

OPTICAL SYSTEM WITH ANGULAR COMPENSATOR

RELATED APPLICATIONS

This application is a continuation of U.S. patent application Ser. No. 10/770,846, filed Feb. 3, 2004 by the same inventors, which has issued as U.S. Pat. No. 7,165,843 and is incorporated herein by reference in its entirety.

BACKGROUND OF THE INVENTION

1. Field of the Invention

This invention relates generally to liquid crystal display devices, and more particularly to a method and apparatus for preventing unwanted reduction of contrast in images created thereby. A predominant current usage of the inventive improved optical system with angular compensation is in the correction of angularly dependent error caused by birefringence in reflective liquid crystal display devices, particularly but not exclusively in off axis optical systems, wherein angular dependant differences in the index of refraction will tend to create unintended changes in the brightness of an image.

2. Description of the Background Art

In a liquid crystal display (LCD") imaging apparatus, it is important to carefully regulate the amount of light which forms each pixel of a displayed image, so as to provide the correct amount of contrast between lighter and darker portions of an image.

FIG. 1. is a block diagrammatic representation showing a typical reflective display based three color projection system 100, illustrating the operation of a polarizing electro-optical imaging system. The projection system 100 has an illumination source 102, a polarizing beam splitter 104, a color separator 106, a plurality of reflective liquid crystal displays (LCDs) 108(r, g, and b), and projection optics 110. Illumination source 102 generates a source beam of white light and directs the source beam toward polarizing beam splitter 104, which passes one portion of the source beam having a first polarity, and redirects another portion (an illumination beam) of the source beam having a second polarity along a system axis 112, toward color separator 106. Color separator 106 separates the illumination beam into its red, green, and blue components, and directs each of these colored illumination beams to a respective one of LCDs 108(r, g, and b). Each of LCDs 108(r, g, and b) is controlled by a system, e.g., a computer or other video signal source (not shown), and modulates the polarity of selective portions (i.e., pixels) of the colored illumination beams to form colored imaging beams, which are reflected back toward color separator 106. Color separator 106 recombines the colored imaging beams to form a composite imaging beam and directs the composite imaging beam back along system axis 112, toward polarizing beam splitter 104, which passes only the modulated portions of the composite imaging beam to projection optics 110. Projection optics 110 then focuses the modulated portions of the composite imaging beam onto a display surface (not shown).

The example of FIG. 1 is an "on-axis" system, in that the beams from the beam splitter 104 to the color separator 106 and also the beams from the color separator 106 back through the beam splitter 104 are on the common system axis 112. Even in such an example, some rays of the beam will impinge upon the LCDs 108 at different angles as compared to other rays, although the chief, or average, ray will be essentially perpendicular to the surface of the LCDs 108. As can be appreciated by one skilled in the art, and as will be discussed in more detail hereinafter, in "off-axis" systems, wherein the two paths diverge, the chief, or average, ray will be far from perpendicular to the surface of the LCDs 108.

Typically, in a reflective liquid crystal display apparatus such as the three color projection system 100, each portion of light (light ray) which is to represent a pixel in a resultant image is polarized with a polarizer (such as the polarizing beam splitter 104 of FIG. 1), and is then directed through a liquid crystal material such as is found in the LCD's 108, and then exits toward the projection optics 110 through an "analyzer". In the "on axis" example of FIG. 1, the beam splitter 104 serves both as the polarizer and as the analyzer.

There are two problems associated with the angular dependence of the retardation of the LC material. Note that any angular variation of the retardation will change the way in which the LCD modifies the polarization of light, and therefore will change the system performance, almost always in a negative fashion. In most cases, the LC is designed to work optimally on axis, that is, for a ray of light that impinges upon the LCD imager perpendicular to its surface. In any real display system, the light hitting any given point on the projection screen will come from a whole range of angles. The farther these rays are from the perpendicular at the LCD, the further the operation of the LCD for these rays will be from optimal. While the details of the angular distribution will depend on the details of the optical design, there will be a significant range of angles for all such designs. In general, this variance from perpendicularity will degrade the performance of the system, most noticeably by lowering the contrast.

For the on axis design of FIG. 1, the center ray of this range of angles will be close to perpendicular at the LCD, but even in this case, there will be a degradation of performance because of the many non-perpendicular rays. For the off-axis design of FIG. 2, however, the center ray will in general be far from perpendicular, and it is possible that none of the rays will be so.

Secondly, such angular change will be different in different areas of the liquid crystal display apparatus. As discussed above, the light from each pixel on the LCD, which is transferred to a corresponding point on the projection screen, is an average over many angles. For some optical designs, and particularly for the off-axis design of FIG. 2, this set of angles will be different for each and every pixel. Therefore, the undesired contrast shift discussed above will not be uniform across the entire liquid crystal display.

It would be advantageous to have some method or means for preventing unwanted polarization aberrations across the surface of a liquid crystal imaging apparatus.

SUMMARY

The present invention overcomes the problems discussed above in relation to the prior art by providing a compensator in the beam path. According to the present invention, a compensator is placed in the path of light incident upon and/or reflected from a liquid crystal imaging device. The compensator is designed to exhibit retardation that is generally equal in magnitude and opposite in sign to the retardation of the underlying liquid crystal material. In a particular embodiment, the compensator is a negative c-plate produced by form birefringence (periodic stacks of thin film layers), and the imaging device is a vertically aligned, nematic liquid crystal device ("VAN cell"). In at least some embodiments of the invention the compensator is placed very close to the liquid crystal portion of the LCD display device, such that the angle of incidence of each ray on the compensator will be very close to the corresponding angle of incidence for the same ray on the liquid crystal layer. For example, in one system, the negative c-plate is formed on the cover glass of the imager. In another example, the negative c-plate is formed on the plano surface of a field lens.

It is an advantage of the present invention that variations in the retardation seen by each ray portion of a beam are neutralized by a compensator.

It is another advantage of the present invention that the intended brightness for each portion of an image is achieved.

It is still another advantage of the present invention that improved contrast can be achieved, since the angular dependence of the LC retardation will have been substantially compensated for.

It is still another advantage of the present invention that improved contrast uniformity across the display can be achieved, since there is no substantial differential brightness offset in different portions of a projected image caused by differences in the index of refraction to which such different portions may be subjected.

It is yet another advantage of the present invention that the desired brightness for each pixel is achieved, without unwanted variations or aberrations caused by the retardation of the liquid crystal display device.

These and other objects and advantages of the present invention will become clear to those skilled in the art in view of the description of modes of carrying out the invention, as described herein and as illustrated in the several figures of the drawing. The objects and/or advantages discussed herein are not intended to be an exhaustive listing of all possible objects or advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and/or advantages. Accordingly, any objects and/or advantages that are discussed herein are not essential elements of the present invention, and should not be construed as limitations.

BRIEF DESCRIPTION OF THE DRAWINGS

The present invention is described with reference to the following drawings, wherein like reference numbers denote substantially similar elements.

DETAILED DESCRIPTION

Figure 1:
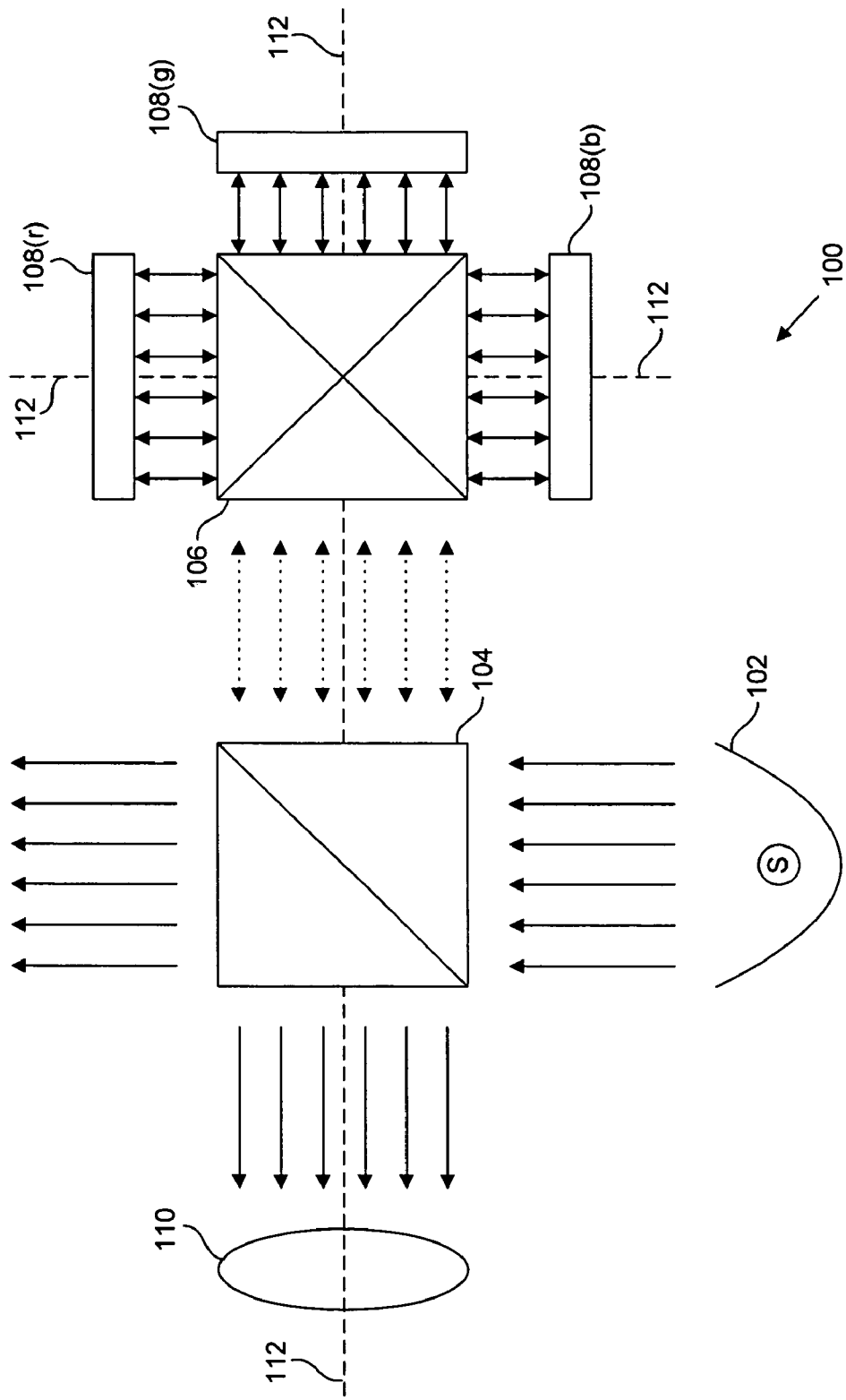
FIG. 1 is a block diagram of a prior art reflective projection system.

This invention is described in the following description with reference to the Figures, in which like numbers represent the same or similar elements. While this invention is described in terms of modes for achieving this invention's objectives, it will be appreciated by those skilled in the art that variations may be accomplished in view of these teachings without deviating from the spirit or scope of the present invention. The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

In the following example, some details of some well known optical practices (such as alignment, mounting, focusing, and the like) and components (such as illumination sources, various lenses, reflective LCD imagers, and the like) have been omitted, so as not to unnecessarily obscure the present invention.

The present invention overcomes the problems associated with the prior art, by providing an electro-optical imaging system having an aberration compensation element disposed between a polarizer and an analyzer to compensate for polarization aberrations resulting from variations of the retardation of the LCD imaging device with ray incident angle.

Figure 2:
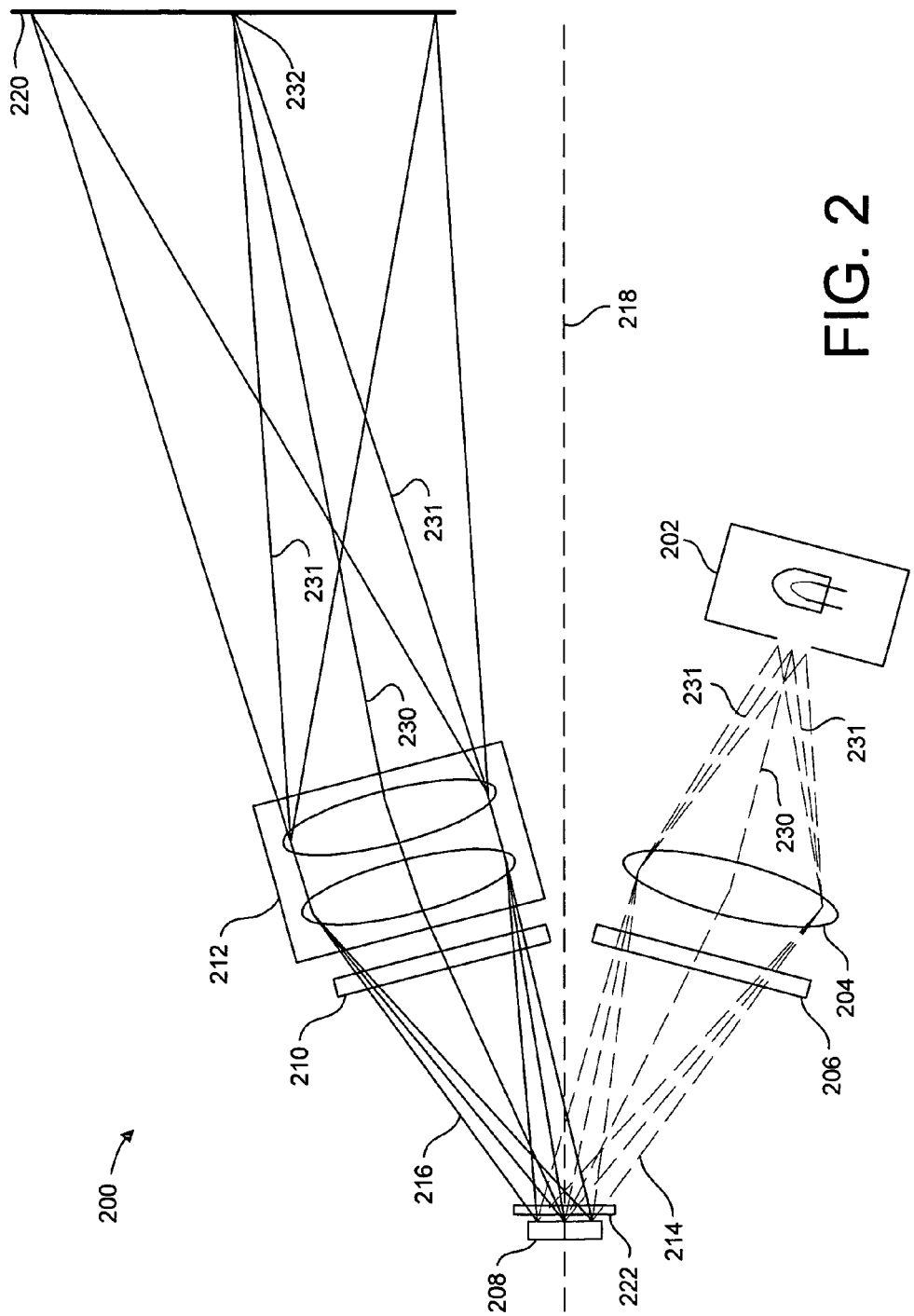
FIG. 2 is a block diagram of an off-axis projection system including a compensation element according to the present invention.

FIG. 2 is a diagrammatic representation of an example of an off-axis projection system 200 to having an illumination source 202, a condenser lens 204, a polarizer 206, a reflective LCD 208, an analyzer 210, and a projection lens group 212. The illumination source 202 generates an illumination beam 214 that is focused by condenser lens 204 to pass through polarizer 206, and impinge on LCD 208 at a non-perpendicular angle. LCD 208 modulates the polarized illumination beam 214, on a pixel by pixel basis, to form an imaging beam 216, and reflects the imaging beam 216 through analyzer 210 toward projection lens group 212. A system axis 218 is perpendicular to the plane of the LCD 208.

In this present example, the angular separation between illumination beam 214 and imaging beam 216 allows for the separation of polarizer 206 and analyzer 210. In this particular embodiment, polarizer 204 and analyzer 210 are both sheet polarizers of material HN42HE manufactured and sold by Polaroid Corporation. The transmission axes of polarizer 206 and analyzer 210 are oriented orthogonal to one another, such that no light will pass through analyzer 210, unless the polarization vector of a particular light ray is modulated by reflective LCD 208, or unless the light is subject to a polarization aberration. If, however, a pixel of reflective LCD 208 rotates the polarization axis of a light ray by 90 degrees, then the light should pass through analyzer 210 at maximum intensity, unless the light is subjected to a polarization aberration. A polarization state that is intermediate between these two extreme cases results in an intermediate intensity level.

As can be seen in the view of FIG. 2, a compensation element 222 is placed in front of the reflective LCD 108 such that the illumination beam 214 and the imaging beam 216 both pass there through. As will be discussed in greater detail hereinafter, the compensation element 222 is a negative c plate which has retardation approximately equal in magnitude but opposite in sign as the retardation of the liquid crystal material in the reflective LCD 208.

In anisotropic materials, the index of refraction (n) of the material depends on the direction that the light is traveling. Anisotropic materials are, therefore, also referred to as being birefringent.

Nematic liquid crystals are a type of uniaxial material. Uniaxial materials are birefringent materials that have a unique direction, referred to as the optical axis, along which the index of refraction ($n_e$) is an extremum (either maximum or minimum). For all rays traveling perpendicular to the optical axis the index of refraction ($n_o$) is constant. The birefringence ($\Delta n$) of uniaxial materials is defined as the difference between the index of refraction along the optical axis ($n_e$) and the index of refraction along a direction perpendicular to the optical axis ($n_o$):

$$\Delta n = n_e - n_o$$

Note that the birefringence ($\Delta n$) can be either a positive or negative value, and is a property of the material not dependent on angle of incidence.

Polarization aberrations are induced by birefringent materials as a result of retardation. Retardation (R) is the total phase difference induced in two mutually perpendicular polarized states of light as a result of the different indices of refraction $n_e$ and $n_o$. Retardation can be expressed as a distance:

$$R = \Delta n \cdot d$$

where (d) is the thickness of the material traversed. Note that $\Delta n$, as described above, is unitless.

In order for compensation element 222 to compensate for polarization changes caused by the retardation of LCD 208, the retardation induced by compensation element 222 should be equal in magnitude, but opposite in sign to the retardation induced by LCD 208. That is, the retardation of the compensation element 222 should conform generally to the equation:

$$\Delta n_{lc} \cdot d_{lc} + \Delta n_c \cdot d_c = 0$$

where ($\Delta n_{lc}$) is the birefringence of the liquid crystal material of the LCD 208, ($d_{lc}$) is the thickness of the liquid crystal layer; ($\Delta n_c$) is the birefringence of compensation element 222, and ($d_c$) is the thickness of compensation element 222. As will be discussed in greater detail hereinafter, it is desirable to keep the compensation element 222 quite close to the reflective LCD 108 such that the angle of the incident light ray will not be substantially different as between the compensation element 222 and the reflective LCD 108. Further, it is desirable that the liquid crystal layer of LCD 208 and compensation element 222 have the same angular dependence of retardation.

To obtain similar angular dependence, the liquid crystal layer of LCD 208 and compensation element 222 are selected to be c-plates. Most uniaxial devices and/or compensation elements can be classified as either an "a-plate" or a "c-plate."

An a-plate is a uniaxial material oriented with the optical axis parallel to the incident surface of the material. Therefore, a ray of light incident on an a-plate on-axis (perpendicular to the surface of the material) will be subjected to the full retardation. In contrast, a c-plate is a uniaxial material oriented with the optical axis perpendicular to the incident surface of the material. Therefore, a ray of light incident on a c-plate on-axis will be subjected to no retardation, because the index of refraction for all directions perpendicular to the optical axis is the same (i.e., $n_o$). Further, similarly oriented c-plates will exhibit similar angular dependence with respect to retardation.

Most compensation elements (e.g., quarter-wave plates, half-wave plates, etc.) are a-plates. However, VAN cells are essentially c-plates, and the inventors have found that using negative c-plate compensator 222 in combination with LCD 208 (a VAN cell) significantly corrects for angular dependent polarization aberrations. Compensation element 222 is a negative c-plate, because VAN cells are positive c-plates and, as indicated above, the retardation of compensation element 222 must be equal in magnitude but opposite in direction compared to LCD 208.

The invention can be described in a much more general way. For a given optical system containing one or more LCDs, each of the LCDs has been designed to work optimally for some given voltage state, characterized by a voltage $V_{opt}$, and for some given ray angle, characterized by a viewing angle $\Omega_{opt}$. In many cases, the optimal voltage will correspond to that which produces the dark state of the system, since this is frequently that state which is most susceptible to performance degradation due to birefringence.

In general, the retardation of the LC will depend on both the voltage V and the viewing angle $\Omega$. In the optimal state, the retardation will equal the specific optimal retardation value, defined by value $R_{LCD}(\Omega_{opt}) = R_{opt}$. For other angles $\Omega$, the LCD retardation will have other values. Because, as described above, the light reaching screen 220 in FIG. 2 is an average over many angles $\Omega$, the performance of the system will be degraded because the retardation of the LC is not equal to the value $R_{opt}$ for all angles $\Omega$.

The invention comprises adding a compensation means to the system such that the sum of the retardations of the LCD and the compensation means are equal to $R_{opt}$ for all angles $\Omega$ which contribute to the system performance at the screen. That is, $$R_{LCD}(\Omega) + R_C(\Omega) = R_{opt},$$

for all $\Omega$ which contribute to system performance at the screen.

The invention can be further generalized in two ways. First, there may be other elements in the system which contribute to overall retardation, for example, polarizers or thin film coatings on various optical elements. Assuming that there are N such elements and each of these have their own retardation $R_n(\Omega)$, then optimum compensation is achieved when $$R_{LCD}(\Omega) + R_C(\Omega) + \sum_{n=1}^{N} R_n(\Omega) = R_{opt}$$

That is, the compensation means is compensating for all birefringent elements in the system.

Secondly, there may be systems where the angles $\Omega$ are different when passing through each of the different elements. For example, if there is an optical element with power situated between the LCD and the compensating means, then $\Omega_{LCD}$ and $\Omega_C$ will be different for a particular ray. In this case, the optimization requirement for a particular ray can be expressed as follows:

$$R_{LCD}(\Omega_{LCD}) + R_C(\Omega_C) + \sum_{n=1}^{N} R_n(\Omega_n) = R_{opt},$$

where now the ray impinges on each element at a different angle.

It will be clear to those skilled in the art that the above conditions defining the retardation value of the compensation element will offer a great benefit to the system performance even when the conditions are not completely met, which will often be the case in a physical embodiment.

An example of such a non-optimal but still beneficial invention will occur for most real systems. Referencing FIG. 2, consider a point 232 on the screen 220. The light which impinges on this point determines the system performance at that point. As indicated, all of the light within the ray bundle 231 hits the screen at this point. This ray bundle is centered around the chief ray 230. Note that the angles $\Omega$ are different for the various rays in the ray bundle. In many systems it will not be possible to have the optimization condition defined above to be met precisely for each and every ray in the ray bundle 231. One approach to this problem is to meet this condition exactly for the chief ray 230. Alternatively, some average of the above optimization condition can be minimized over the entire ray bundle 231. Both of these embodiments of the invention should lead to improved system performance, e.g., improved contrast.

In reference to the specific embodiment described above, the VAN cell is usually optimized for the voltage $V_{opt}=0$ (because this is the dark state), and for the on-axis viewing angle. In this case, the optimal retardation is equal to or close to 0. However, other applications should be clear to those skilled in the art. For example, the LCD could be an ECB (Electronically Controlled Birefringence) or Pi cell, in which case the optimal voltage would not be 0, but some higher value, for example 5 V, since the dark state for these modes occurs at this higher voltage. Other than this change in voltage, the invention still applies directly.

For the specific embodiment using a VAN cell, the way in which the invention can be realized is as follows. The optimal voltage is 0 V, and the optimal angle is on-axis. For this optimal state, the VAN cell forms a c-plate with positive birefringence, and its on-axis (optimal) retardation is zero. The invention requires that the sum of the LCD and compensation element retardations sum to the optimal value of zero for all angles $\Omega$. This can be achieved by requiring the compensating element to be a c-plate with negative birefringence, since in this case the retardations of the two will sum to the optimal value of zero for all angles $\Omega$.

In the embodiment of the invention described, the negative c-plate (compensation element 222) is constructed using a technique known as "form birefringence". This technique is described in the publication *Principles of Optics* by Born and Wolf, which is well known and commonly available. According to the form birefringence method, the negative c-plate is formed by building up a periodic stack of thin film layers.

Figure 3:
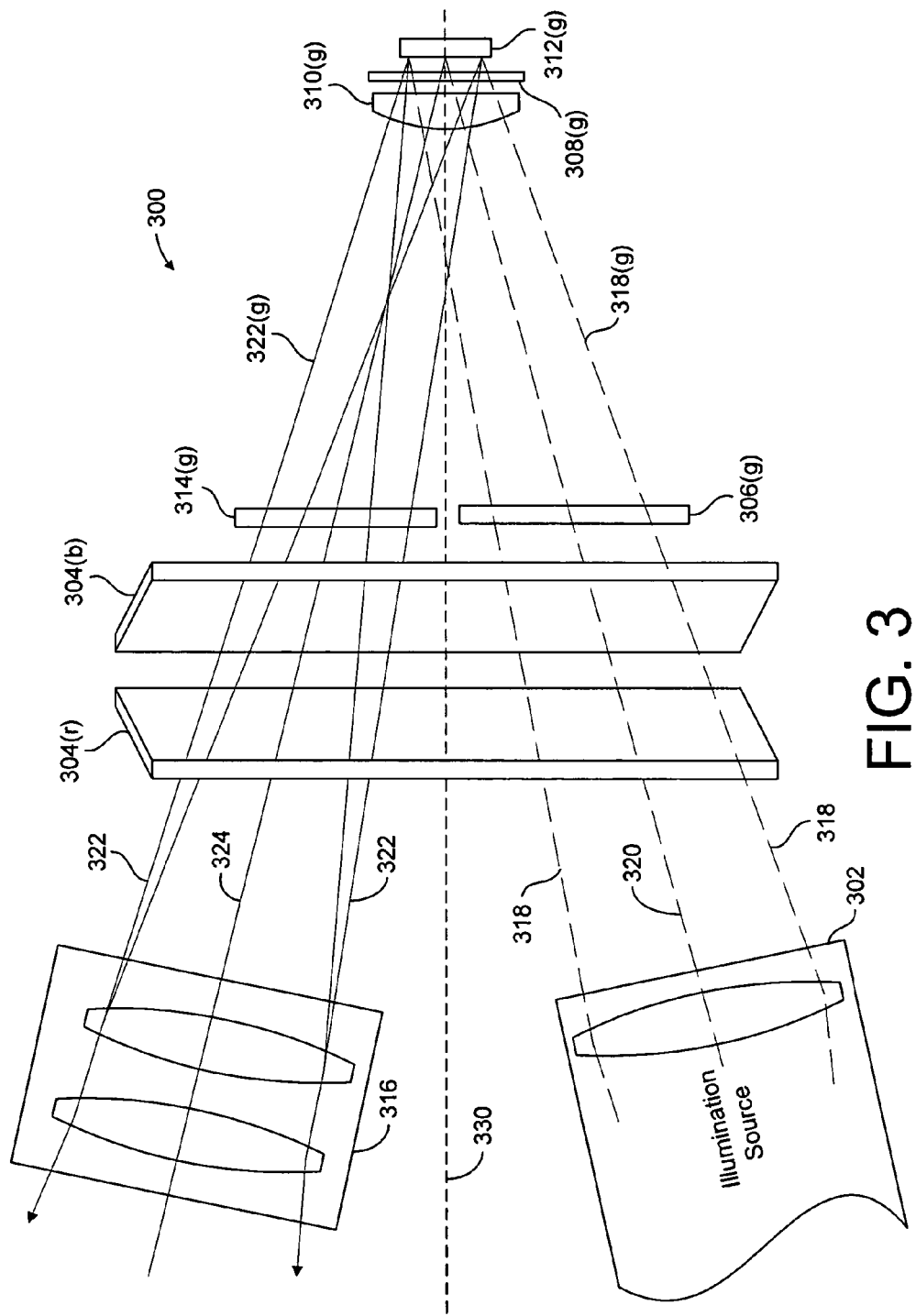
FIG. 3 is a side diagrammatic view of one channel of a multi-channel imaging system including an aberration compensation element according to the present invention.

FIG. 3 shows one channel (the green channel) of a multi-channel (multi-color) off-axis projection system 300, including an illumination source 302, a pair of dichroic plates 304 (*r* and *b*), a polarizer 306(*g*), a compensation element 308(*g*), a field lens 310(*g*), a reflective LCD 312(*g*), an analyzer 314(*g*), and a projection lens group 316. Illumination source 302 generates an illumination beam 318, and directs illumination beam 318, along an optical path 320, through dichroic plates 304(*r, b*) polarizer 306(*g*), aberration compensation element 308(*g*), and field lens 310 to impinge on LCD 312(*g*). Dichroic plates 304 (*r* and *b*) reflect red and blue portions (not shown in FIG. 3) of illumination beam 318, respectively, and transmit the green portion 318(*g*) of illumination beam 318. Polarizer 306(*g*) linearly polarizes green illumination beam 318(*g*) into a first polarized state, corresponding to the transmission axis of polarizer 306(*g*). LCD 312(*g*) modulates the polarized beam and reflects an imaging beam 322(*g*) (the modulated, polarized beam) through analyzer 314(*g*).

Figure 4:
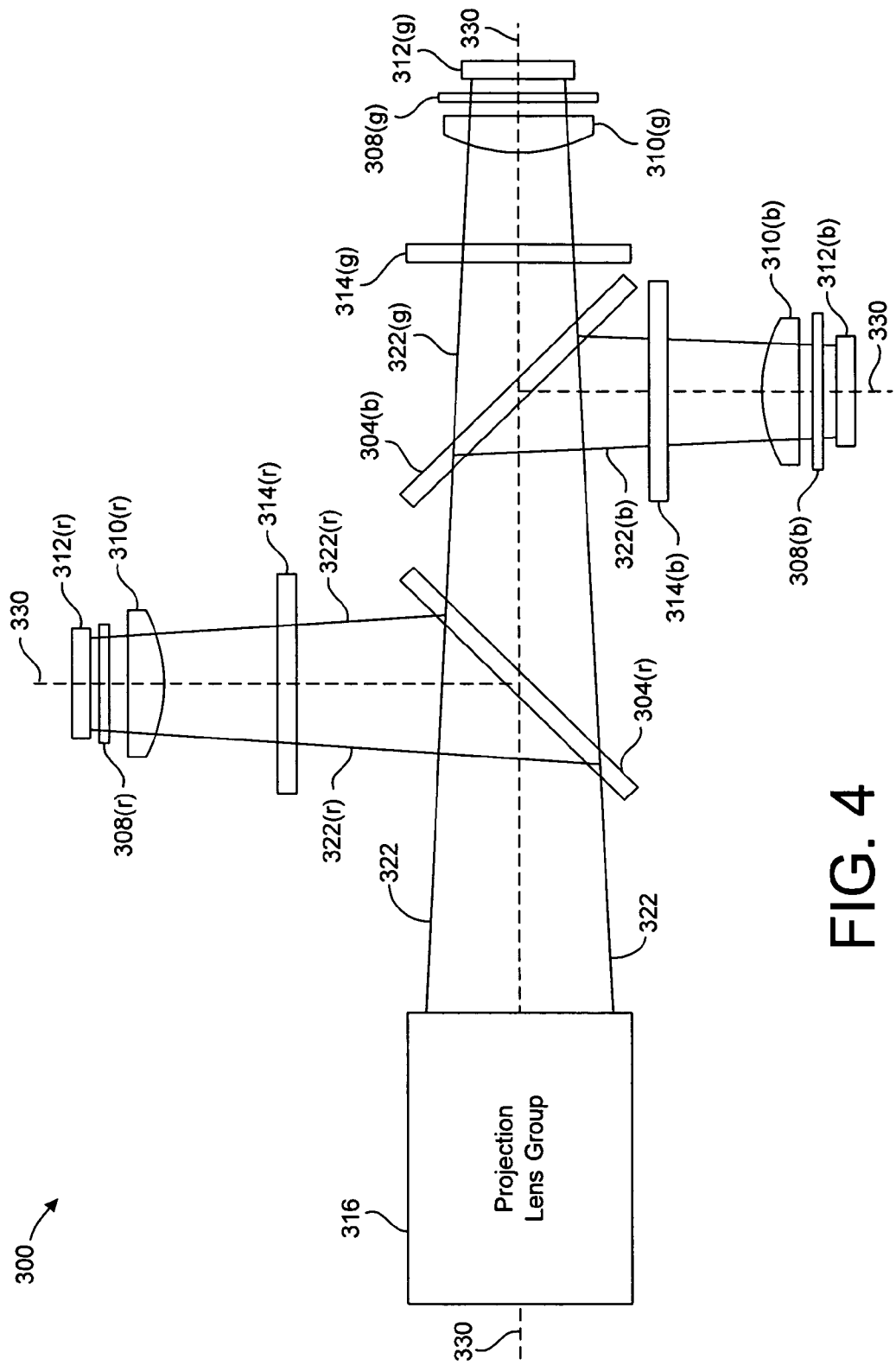
FIG. 4 is another diagrammatic view of the imaging system of FIG. 3.

FIG. 4 is another diagrammatic view of the projection system 300 of FIG. 3 showing the green channel in context with the remaining color channels of the system. In this view, system axis 330 lies in the plane of the page, while imaging beams 322 (*r, g, b*) and 322 extend up out of the page, and obscure the views of illumination beams 318 (*r, g, b*) and 318, which rise from illumination source 302 located beneath the plane of the page. Similarly, analyzers 314 (*r, g, b*) are disposed above the plane of the page, and obscure the views of polarizers 306 (*r, g, b*), respectively. Compensation elements 308 (*r, g, b*) and imagers 312 (*r, g, b*) pass through the plane of the page and are centered on system axis 330.

The LCD 312(*g*) is controlled by a system, such as a computer or video signal source (not shown), such that the polarity of selected portions (i.e., pixels) of green illumination beam 318(*g*) are modulated to form a green imaging beam 322(*g*), which is reflected along an optical path 324, through analyzer 314(*g*) and dichroic plates 304(*r, b*). Dichroic plates 304 (*r, b*) combine green imaging beam 322(*g*) with the red and blue imaging beams 322(*r*) and 322(*b*) (which have also been modulated as described), to form imaging beam 322 which continues along optical path 324 into projection lens group 316. Field lens 310(*g*) focuses the aperture stop (not shown) of illumination source 302 at a field stop (not shown) near the rear of projection lens group 316, thus avoiding the loss of much of the light of illumination beam 318.

Analyzer 314(*g*) is also a linear polarizer. Projection system 300 can operate in at least two different modes. For example, if the transmission axis of analyzer 314(*g*) is oriented parallel to the transmission axis of polarizer 306(*g*), then analyzer 314(*g*) will pass unmodulated portions and block modulated portions of green imaging beam 322(*g*). On the other hand, if the transmission axis of analyzer 314(*g*) is oriented orthogonally with respect to the transmission axis of polarizer 306(*g*), then analyzer 314(*g*) will pass modulated portions and block unmodulated portions of green imaging beam 322(*g*). In one embodiment, polarizer 306(*g*) and analyzer 314(*g*) are both fashioned from HN42HE polarizing material available from Polaroid Corporation.

The compensation element 308(*g*) is positioned in green illumination beam 318(*g*) and imaging beam 322(*g*), to compensate for retardation induced in the beams due to the birefringent property of the reflective LCD 312(*g*). The use of separate compensation elements for each color of the projection system 300 permits the compensation elements 308 to be optimized for a particular color (red, green or blue) of light. Also note that the compensation elements 308 will work most effectively if there is no optical element with optical power between these and the LCDs 312.

Figure 5:
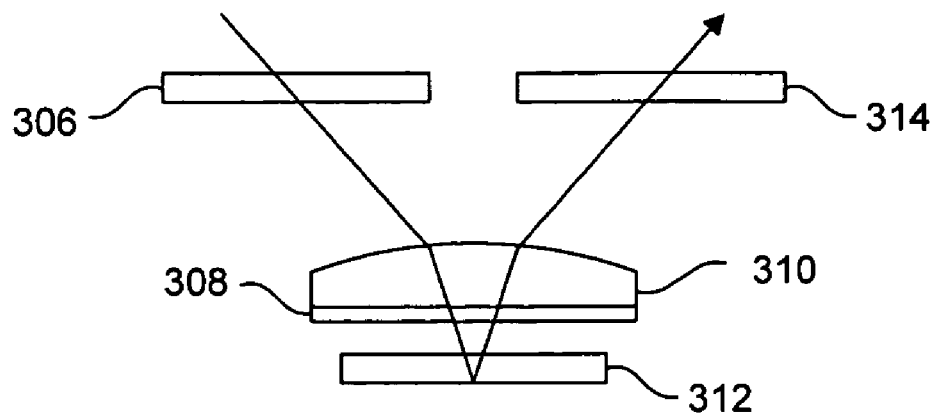
FIG. 5 is a diagrammatic view showing a portion of an imaging system with a compensator element affixed to the piano surface of a lens.
Figure 6:
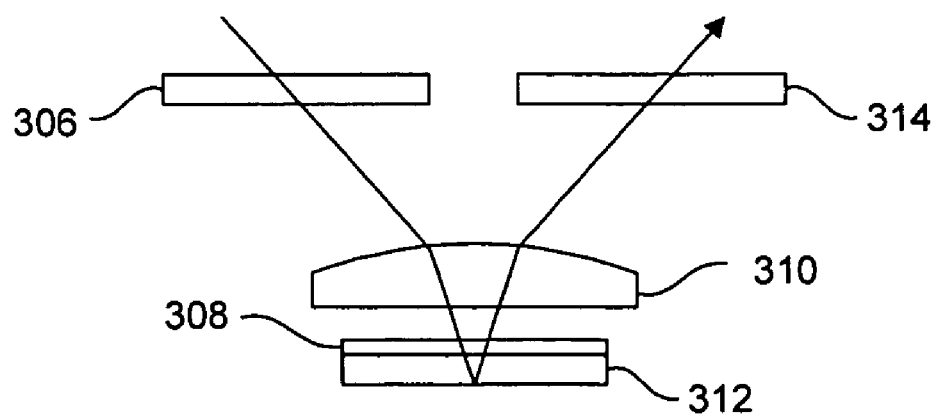
FIG. 6 is a diagrammatic view showing a portion of an imaging system with a compensator element affixed directly to an LCD device.

FIGS. 5 and 6 are side diagrammatic views showing examples of the polarizer 306, the analyzer 314, and the reflective LCD 312, as previously discussed herein. In the view of FIG. 5 it can be seen that the compensation element 308 is positioned on the back of the field lens 310. In the view of FIG. 6, the compensation element 308 is positioned directly on the front glass of the reflective LCD 312. It is advantageous that rays of light which pass through the liquid crystal layer of the reflective LCD 312 pass through compensation element 308 at the same, or nearly the same, angle. This can be accomplished by placing the compensation element 308 on the plano surface of a lens (the optional field lens 310 in this example). Alternatively, the compensation element 308 can be positioned on essentially any surface (such as another type of lens, an optically inactive substrate, or the like) which is positioned relatively close to the surface of the reflective LCD 312. As illustrated by the example of FIG. 6, the compensation element 308 can also be formed or placed directly on the cover glass of the reflective LCD 312.

In general, the requirement for the compensation element 308 to function optimally is that there be no optical element with optical power between it and LCD 312. However, compensation element 308 can still provide a significant improvement, even if not optimal, when optical elements with power are disposed between it and LCD 312. Thus, it is not an essential element of the invention that absolutely no optical elements with power be disposed between compensation element 308 and LCD 312.

It should be noted that, when the compensation element 308 is created using "form birefringence" method discussed above, the thin films used may be made from inorganic materials. In such instances, the compensation element 308 can be made very rugged, and will have a very long useful life.

It should also be noted that the invention is intended to correct for retardation of light modulation elements which have a known or discernable birefringence characteristic, and for which a compensation element can be formed using known methods or those yet to be developed.

Figure 7:
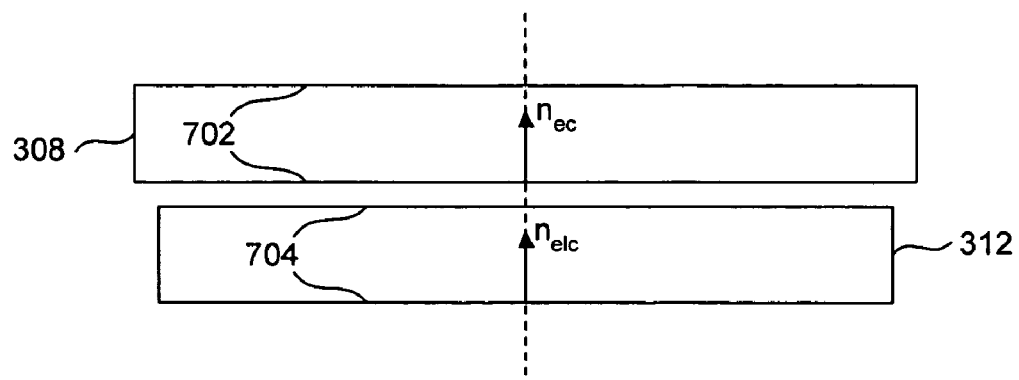
FIG. 7 is a diagrammatic view showing one relative orientation of the optical axes of a compensator element and an imager.

FIG. 7 is a diagrammatic view showing one relative orientation of the optical axes of a compensation element 308 and the liquid crystal layer of an imager 312. In particular, the optical axis $n_{ec}$ of compensation element 308 is perfectly aligned with the optical axis $n_{elc}$ of imager 312. Additionally, optical axis $n_{ec}$ is oriented perpendicular to the incident surfaces 702 of compensation element 308, and optical axis $n_{elc}$ is oriented perpendicular to the incident surfaces 704 of the liquid crystal layer of imager 312. Thus, compensation element 308 and imager 312 are true c-plates. While this particular orientation of the optical axes $n_{ec}$ and $n_{elc}$ would provide the desired correspondence between the angular dependency of the retardation of compensation element 308 and imager 312, it is more likely that the orientation of optical axis $n_{ec}$ and/or $n_{elc}$ will be slightly modified to accommodate practical design considerations.

Figure 8:
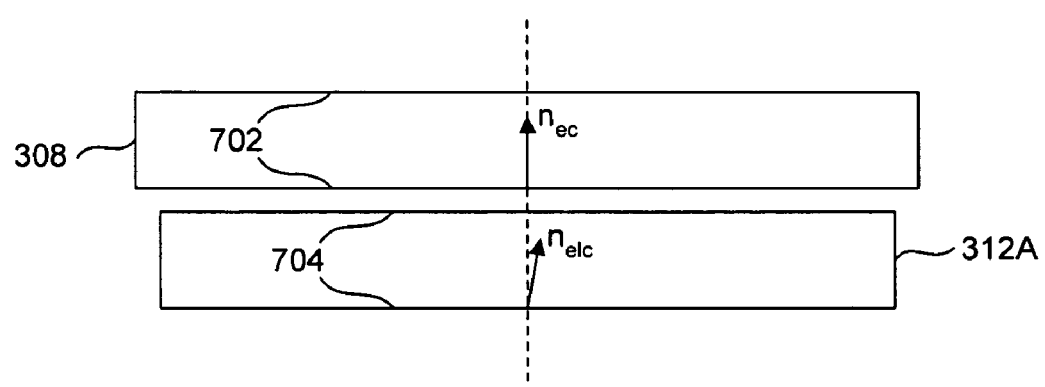
FIG. 8 is a diagrammatic view showing another relative orientation of the optical axes of a compensator element and an imager.

FIG. 8 is a diagrammatic view showing one such modification of the relative orientation of the optical axis $n_{ec}$ of compensation element 308 and $n_{elc}$ of an alternate imager 312A. Note that optical axis $n_{elc}$ is tilted slightly with respect to the vertical, and is no longer perfectly aligned with optical axis $n_{ec}$ of compensation element 308. Nevertheless, this embodiment of the invention provides a significant improvement over the prior art.

The tilting (e.g., 3-5 degrees) of optical axis $n_{elc}$ is typically designed into VAN cells, so that when an electric field is applied across the liquid crystal there is a preferred direction in which the crystals will uniformly "fall over." Thus, in this example, imager 312A is not technically a true c-plate, because optical axis $n_{elc}$ is not perpendicular to incident surfaces 704. However, as used herein the term c-plate should be understood to include such materials wherein the optical axis is substantially perpendicular to the surface of the material. According to this definition, imager 312A is a c-plate. As used herein, the term substantially perpendicular includes slight deviations from the true perpendicular by as much as 20 degrees, although smaller deviations (e.g., 3-10 degrees) will be more common in most applications.

Figure 9:
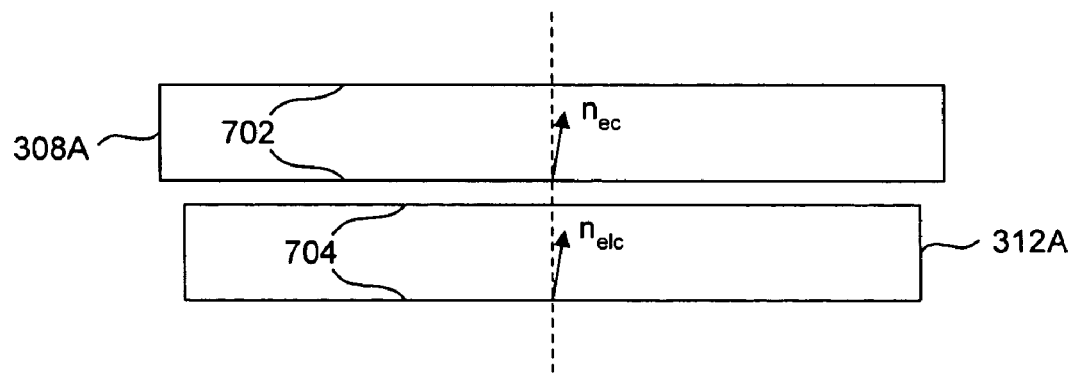
FIG. 9 is a diagrammatic view showing another relative orientation of the optical axes of a compensator element and an imager.

FIG. 9 is a diagrammatic view showing another relative orientation of the optical axes $n_{ec}$ and $n_{elc}$. In this particular example, optical axis $n_{ec}$ of an alternate compensation element 308A is also titled, so as to be parallel with optical axis $n_{elc}$ of imager 312A. While the alignment of optical axes $n_{ec}$ and $n_{elc}$ in this example is expected to provide some improvement as compared to the example of FIG. 8, the inventors expect that compensation element 308A might be difficult to manufacture.

Figure 10:
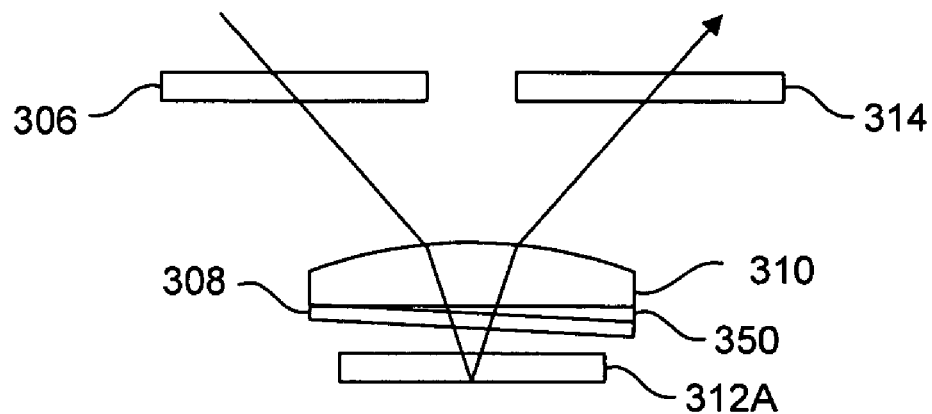
FIG. 10 is a diagrammatic view of a physical implementation to achieve the relative orientation of optical axes shown in FIG. 9.
Figure 11:
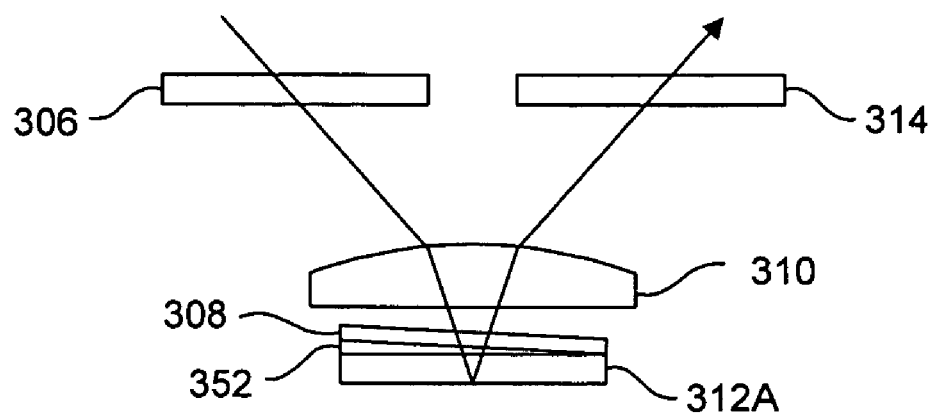
FIG. 11 is a diagrammatic view of another physical implementation to achieve the relative orientation of optical axes shown in FIG. 9.

FIG. 10 is a diagrammatic view of a physical implementation to achieve the relative orientation of optical axes $n_{ec}$ and $n_{elc}$, as shown in FIG. 9, but using compensation element 308 of FIG. 7 and FIG. 8, which can be manufactured via the "form birefringence" method described above. In particular, compensation element 308 is physically tilted to align optical axes $n_{ec}$ and $n_{elc}$ (not shown in FIG. 10). For example, as shown in FIG. 10, compensation element 308 is positioned with respect to field lens 310 via a wedge 350. As another example, as shown in FIG. 11, compensation element 308 is positioned with respect to imager 312 via a wedge 352. Alternatively, compensation element 308 can be separate from both field lens 310 and imager 312, and be independently mounted to align optical axes $n_{ec}$ and $n_{elc}$ (not shown in FIG. 10).

The invention has been described herein primarily using an off-axis (non-telecentric) system. It is thought that this type of system will benefit most from the present invention, since the greater the angle of incidence between the LCD imagers and the beams entering and leaving the liquid crystal material thereof, the greater will be the unwanted effects of the birefringence property of the material and, therefore, the greater will be the need to compensate for such effects. However, it should be noted that, even in an on-axis system (such as the prior art example shown in FIG. 1), there will be some difference in the range of angles of incidence of rays entering and leaving the LCD material. Therefore, it is thought that the invention will also provide a significant advantage in an on-axis system, also, in at least some applications. Further, it is anticipated that the invention will provide a significant improvement when used in conjunction with transmissive displays.

In some cases, there may be other optical elements in the display system which have birefringence, and in these cases, the retardation of the compensator can be modified to compensate for the angular dependence of the LCD and these other elements. For example, it is not uncommon for the polarizer and analyzer elements to have components which are essentially c-plates. In this case, the compensator retardation should be set to be equal in magnitude but opposite in sign as the sum total of all c-plates in the system, which includes the LCD and the polarizer and analyzer.

All of the above are only some of the examples of available embodiments of the present invention. Those skilled in the art will readily observe that numerous other modifications and alterations may be made. Many of the described features may be substituted, altered or omitted without departing from the spirit and scope of the invention. Therefore, one skill in the art could readily create variations of the invention to adapt it according to the needs or convenience of a particular application. Accordingly, this disclosure is not intended as limiting and the appended claims are to be interpreted as encompassing the entire scope of the invention.

We claim:

1. An electro-optical imaging system comprising:
   a polarizer disposed to polarize an illumination beam to form a polarized illumination beam;
   a reflective light modulator for modulating said polarized illumination beam to form a modulated beam;
   an analyzer disposed in the path of said imaging beam; and
   a compensation element for compensating for aberrations dependent on the angles at which the illumination beam and the modulated beam enter and leave the reflective light modulator; and wherein
   said light modulator exhibits a particular retardation value at a particular angle of incidence responsive to the application of a particular voltage; and
   said compensation element has a retardation value that is dependent on said particular retardation value of said light modulator.

2. An electro-optical imaging system according to claim 1, wherein said particular voltage is a non-zero voltage.

3. An electro-optical imaging system according to claim 2, further comprising:
   an additional optical component having a retardation disposed in at least one of said illumination beam and said modulated beam; and wherein
   the retardation of said compensation element is roughly equal in magnitude but opposite in sign as the sum of the retardations of said light modulator at said non-zero voltage and said additional optical component.

4. An electro-optical imaging system according to claim 2, wherein the sum of the retardation of said compensation element and the retardation of said light modulator at angles other than said particular angle of incidence is roughly equal in magnitude as the particular retardation value of said light modulator at said non-zero voltage.

5. An electro-optical imaging system according to claim 4, wherein said non-zero voltage corresponds to a dark-state of said light modulator.

6. An electro-optical imaging system according to claim 2, further comprising:
   at least one additional birefringent component; and wherein
   the sum of the retardation of said compensation element, the retardation of said at least one additional birefringent element, and the retardation of said light modulator at angles other than said particular angle is roughly equal to the particular retardation value of said light modulator at said non-zero voltage.

7. An electro-optical imaging system according to claim 2, further comprising:
   at least one optical element with power disposed between said light modulator and said compensation element, such that a light ray impinging on said light modulator at a first angle will impinge on said compensation element at a second different angle; and wherein
   the retardation of said compensation element for rays impinging on said compensation element at said second angle is roughly equal in magnitude but opposite in sign as the retardation value of said light modulator for rays impinging on said light modulator at said first angle.

8. An electro-optical imaging system according to claim 2, further comprising:
   at least one optical element with power disposed between said light modulator and said compensation element; and wherein
   the sum of the retardation of said compensation element, the retardation of said at least one optical element with power, and the retardation of said light modulator at angles other than said particular angle is roughly equal in magnitude to the particular retardation value of said light modulator at said non-zero voltage.

9. An electro-optical imaging system according to claim 1, wherein:
   said light modulator has an optical axis passing through the surface of said light modulator;
   said compensation element has an optical axis substantially perpendicular to said surface of said compensation element;
   said optical axis of said light modulator is tilted with respect to a line perpendicular to the surface of said light modulator; and
   said compensation element is tilted with respect to said light modulator.

10. An electro-optical imaging system according to claim 9, wherein the optical axis of said compensation element is aligned with respect to the optical axis of said light modulator.

11. An electro-optical imaging system according to claim 9, wherein the optical axis of said compensation element is parallel to the optical axis of said light modulator.

12. An electro-optical imaging system according to claim 9, wherein said particular voltage is a non-zero voltage.

13. An electro-optical imaging system according to claim 1, wherein said light modulator is a vertically-aligned, nematic liquid crystal cell.

14. An electro-optical imaging system according to claim 1, wherein:
   said reflective light modulator is a liquid crystal display; and
   said compensation element is a negative c-compensator.

15. An electro-optical imaging system according to claim 1, wherein said compensation element has a retardation value approximately equal in magnitude but opposite in sign to said particular retardation value of said light modulator.

16. An electro-optical imaging system according to claim 1, wherein said compensation element is disposed on a surface of said light modulator.

17. An electro-optical imaging system according to claim 1, further comprising:
   a field lens proximate said light modulator; and wherein
   said compensation element is disposed on a surface of said field lens.

18. A projection system comprising:
   a color separator disposed to separate a multi-colored illumination beam into a plurality of colored illumination beams;
   a plurality of polarizers, each polarizer disposed to polarize a respective one of said colored illumination beams to form a polarized, colored illumination beam;
   a plurality of reflective light modulators, each reflective light modulator for modulating a respective one of said polarized, colored illumination beams to form a colored imaging beam, each of said reflective light modulators disposed to receive a respective one of said polarized, colored illumination beams and further to reflect said colored imaging beam;
   a plurality of analyzers, each of said analyzers disposed to analyze a respective one of said modulated colored beams;
   a plurality of compensation elements for negating effects of retardation of the reflective light modulators, each of said compensation elements disposed between a respective one of said polarizers and a respective one of said analyzers; and a color combiner disposed to combine said colored imaging beams to form a multi-colored imaging beam; and wherein each of said plurality of light modulators exhibits a particular retardation value at a particular angle of incidence responsive to the application of a particular voltage; and each of said compensation elements associated with a respective one of said light modulators has a retardation value that is dependent on said particular retardation value of said respective light modulator.

19. A projection system according to claim 18, wherein said particular voltage applied to each of said plurality of light modulators is a non-zero voltage.

20. A projection system according to claim 19, wherein said particular voltage applied to at least one of said plurality of light modulators is different than said particular voltage applied another one of said plurality of light modulators.

* * * * *